US012812070B2

(12) United States Patent
Yuan

(10) Patent No.: US 12,812,070 B2
(45) Date of Patent: Nov. 24, 2026

(54) METHOD AND APPARATUS OF PROCESSING VIDEO DATA STREAM, METHOD AND APPARATUS OF PROCESSING IMAGE, AND STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Pu Yuan, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 18/996,616

(22) PCT Filed: May 14, 2024

(86) PCT No.: PCT/CN2024/093090
§ 371 (c)(1),
(2) Date: Jan. 17, 2025

(87) PCT Pub. No.: WO2025/001563
PCT Pub. Date: Jan. 2, 2025

(65) Prior Publication Data

US 2026/0032217 A1 Jan. 29, 2026

(30) Foreign Application Priority Data

Jun. 25, 2023 (CN) ......................... 202310755825.3

(51) Int. Cl.
*H04N 7/18* (2006.01)

(52) U.S. Cl.
CPC .................................. *H04N 7/181* (2013.01)

(58) Field of Classification Search
CPC .. H04N 7/181; H04N 21/234; H04N 21/2343; H04N 21/44; H04N 21/4402;
(Continued)

(56) References Cited

U.S. PATENT DOCUMENTS 6,314,137 B1 * 11/2001 Ono ..................... H04N 19/423
348/E7.086
10,311,295 B2 * 6/2019 Tang ....................... G06T 7/543
(Continued)

FOREIGN PATENT DOCUMENTS

CN 109600666 A 4/2019
CN 110677623 A 1/2020
(Continued)

OTHER PUBLICATIONS

International Search Report and Written Opinion dated Aug. 10, 2024, for corresponding PCT Application No. PCT/CN2024/093090, 8 pgs.

*Primary Examiner* — Helen Shibru
(74) *Attorney, Agent, or Firm* — Kinney & Lange, P.A.

(57) ABSTRACT

A method and apparatus of processing a video data stream, a method and apparatus of processing an image, and a storage medium are provided, which may be applied to artificial intelligence technology, and in particular to computer vision, streaming media, etc. The method includes: determining N video data streams from N image acquisition devices, where each video data stream includes at least one data package, and N is an integer greater than or equal to 2; dividing a plurality of data packages in the N video data streams into N data package sets, where each data package set corresponds to a video data stream; determining N first queues respectively corresponding to the N data package sets, where each first queue contains a first storage address in a first storage space for each data package in a data (Continued)

package set corresponding to the first queue; and sending the N first queues.

9 Claims, 8 Drawing Sheets

(58) Field of Classification Search
CPC ........... H04N 21/845; H04N 21/23418; H04N 21/44008; H04N 21/8456
USPC .......................................................... 386/159
See application file for complete search history.

(56) References Cited

U.S. PATENT DOCUMENTS

| | | | | |
|---|---|---|---|---|
| 12,370,410 | B2 * | 7/2025 | Marty ................ | A63B 24/0062 |
| 2020/0169767 | A1 * | 5/2020 | Tandon .............. | H04N 21/2387 |
| 2022/0379202 | A1 | 12/2022 | Zhao et al. | |
| 2026/0172630 | A1 * | 6/2026 | Sugano .............. | H04N 21/4532 |

FOREIGN PATENT DOCUMENTS

| | | | |
|---|---|---|---|
| CN | 110781824 | A | 2/2020 |
| CN | 113285931 | A | 8/2021 |
| CN | 114007102 | A | 2/2022 |
| CN | 116320466 | A | 6/2023 |

* cited by examiner

METHOD AND APPARATUS OF PROCESSING VIDEO DATA STREAM, METHOD AND APPARATUS OF PROCESSING IMAGE, AND STORAGE MEDIUM

CROSS-REFERENCE TO RELATED APPLICATION(S)

This application is a Section 371 National Stage Application of International Application No. PCT/CN2024/093090, filed on May 14, 2024, entitled "METHOD AND APPARATUS OF PROCESSING VIDEO DATA STREAM, METHOD AND APPARATUS OF PROCESSING IMAGE, AND STORAGE MEDIUM", which claims priority to Chinese Application No. 202310755825.3, filed on Jun. 25, 2023, the contents of which are incorporated herein by reference in their entireties.

TECHNICAL FIELD

The present disclosure relates to a field of artificial intelligence technology, and in particular to fields of computer vision, streaming media, etc.

BACKGROUND

It is possible to collect video stream data using an image acquisition device, and then process image frames in the video stream data to obtain an image processing result. For example, a plurality of video data streams collected by a plurality of image acquisition devices may be independently processed, and each video data stream occupies a thread to decode and perform object detection on a video stream data separately. However, such processing method has problems of low efficiency and low accuracy.

SUMMARY

The present disclosure provides a method of processing a video data stream, a method of processing an image, a device of processing a video data stream, a device of processing an image, an apparatus of processing a video data stream, an apparatus of processing an image, a system of processing an image, a storage medium, and a computer program product.

According to an aspect of the present disclosure, a method of processing a video data stream is provided, including: determining N video data streams from N image acquisition devices, where each video data stream includes at least one data package, and N is an integer greater than or equal to 2; dividing a plurality of data packages in the N video data streams into N data package sets, where each data package set corresponds to a video data stream; determining N first queues respectively corresponding to the N data package sets, where each first queue contains a first storage address in a first storage space for each data package in a data package set corresponding to the first queue; and sending the N first queues.

For example, the dividing a plurality of data packages in the N video data streams into N data package sets includes: determining a video identification of a video data stream where each data package is located; dividing the plurality of data packages according to the video identification to obtain N initial data package sets; and determining the N data package sets according to the N initial data package sets.

For example, the determining the N data package sets according to the N initial data package sets includes: ranking the data packages in the initial data package set according to sequence numbers of the data packages in the initial data package set, so as to obtain a data package sequence; and determining the data package set according to the data package sequence.

For example, the data package set includes at least one data package subset, each data package subset includes at least one data package, and each data package subset corresponds to an image frame; the determining N first queues respectively corresponding to the N data package sets includes: adding the first storage address for a current data package to the first queue in response to a detection that the first storage address for a previous data package is contained in the first queue, where the current data package and the previous data package belong to the same data package subset; and adding the first storage address for a current data package subset to the first queue in response to a detection that the first storage address for a previous data package subset is contained in the first queue, where the current data package subset and the previous data package subset belong to the same data package set.

For example, the data package set includes at least one data package subset, and each data package subset corresponds to an image frame; the sending the N first queues includes: sending a target storage address in the first queue in response to a detection that the target storage address in the first queue meets a predetermined condition, where the predetermined condition includes that the data packages indicated by the target storage address are used to determine an image frame.

For example, the predetermined condition further includes that a quantity of image frames corresponding to the N data package sets is greater than or equal to a threshold.

For example, the method further includes: removing a plurality of target data packages from the first storage space in response to the plurality of target data packages being read from the first storage space.

For example, the method further includes: determining a target adjustment parameter according to a scene identification of a target scene, where the target adjustment parameter includes at least one of a target quantity of image acquisition devices and a target acquisition frequency of the image acquisition device; adjusting an actual quantity of image acquisition devices according to the target quantity of image acquisition devices, in response to a detection that the target adjustment parameter includes the target quantity of image acquisition devices; and adjusting an actual acquisition frequency of the image acquisition device according to the target acquisition frequency of the image acquisition device, in response to a detection that the target adjustment parameter includes the target acquisition frequency of the image acquisition device.

For example, the data package includes a network abstract layer unit.

According to another aspect of the present disclosure, a method of processing an image is provided, including: determining N second queues according to N first queues, where N is an integer greater than or equal to 2, and the N second queues contain second storage addresses for data packages in a second storage space; determining a plurality of data packages from the second storage space according to the second storage addresses in the N second queues; determining a plurality of image frames according to the plurality of data packages; and processing the plurality of image frames using a predetermined algorithm to obtain a processing result.

For example, the determining N second queues according to N first queues includes: reading a plurality of target data packages from a first storage space according to first storage addresses in the received first queue; storing the plurality of target data packages in a second storage area; and adding the second storage addresses for the plurality of target data packages in the second storage area to the second queue.

According to another aspect of the present disclosure, a device of processing a video data stream is provided, including: a video data stream determination module configured to determine N video data streams from N image acquisition devices, where each video data stream includes at least one data package, and N is an integer greater than or equal to 2; a dividing module configured to divide a plurality of data packages in the N video data streams into N data package sets, where each data package set corresponds to a video data stream; a first queue determination module configured to determine N first queues respectively corresponding to the N data package sets, where each first queue contains a first storage address in a first storage space for each data package in a data package set corresponding to the first queue; and a sending module configured to send the N first queues.

According to another aspect of the present disclosure, a device of processing an image is provided, including: a second queue determination module configured to determine N second queues according to N first queues, where N is an integer greater than or equal to 2, and the N second queues contain second storage addresses for data packages in a second storage space; a data package determination module configured to determine a plurality of data packages from the second storage space according to the second storage addresses in the N second queues; an image frame determination module configured to determine a plurality of image frames according to the plurality of data packages; and a processing module configured to process the plurality of image frames using a predetermined algorithm to obtain a processing result.

According to another aspect of the present disclosure, an apparatus of processing a video data stream is provided, including a memory and a processor, where the memory stores instructions executable by the processor, and the instructions are configured to, when executed by the processor, cause the processor to perform the method of processing the video data stream as described above.

According to another aspect of the present disclosure, an apparatus of processing an image is provided, including a memory and a processor, where the memory stores instructions executable by the processor, and the instructions are configured to, when executed by the processor, cause the processor to perform the method of processing the image as described above.

According to another aspect of the present disclosure, a system of processing an image is provided, including: N image acquisition devices configured to collect N video data streams; the apparatus of processing the video data stream as described above; and the apparatus of processing the image as described above.

According to another aspect of the present disclosure, a non-transitory computer-readable storage medium storing computer instructions thereon is provided, where the computer instructions are configured to cause a computer to perform the methods described above.

According to another aspect of the present disclosure, a computer program product containing a computer program is provided, where the computer program is configured to, when executed by a processor, implement the methods described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are intended for a better understanding of the solutions and do not constitute a limitation on the present disclosure. In the accompanying drawings.

DETAILED DESCRIPTION OF EMBODIMENTS

Figure 1:
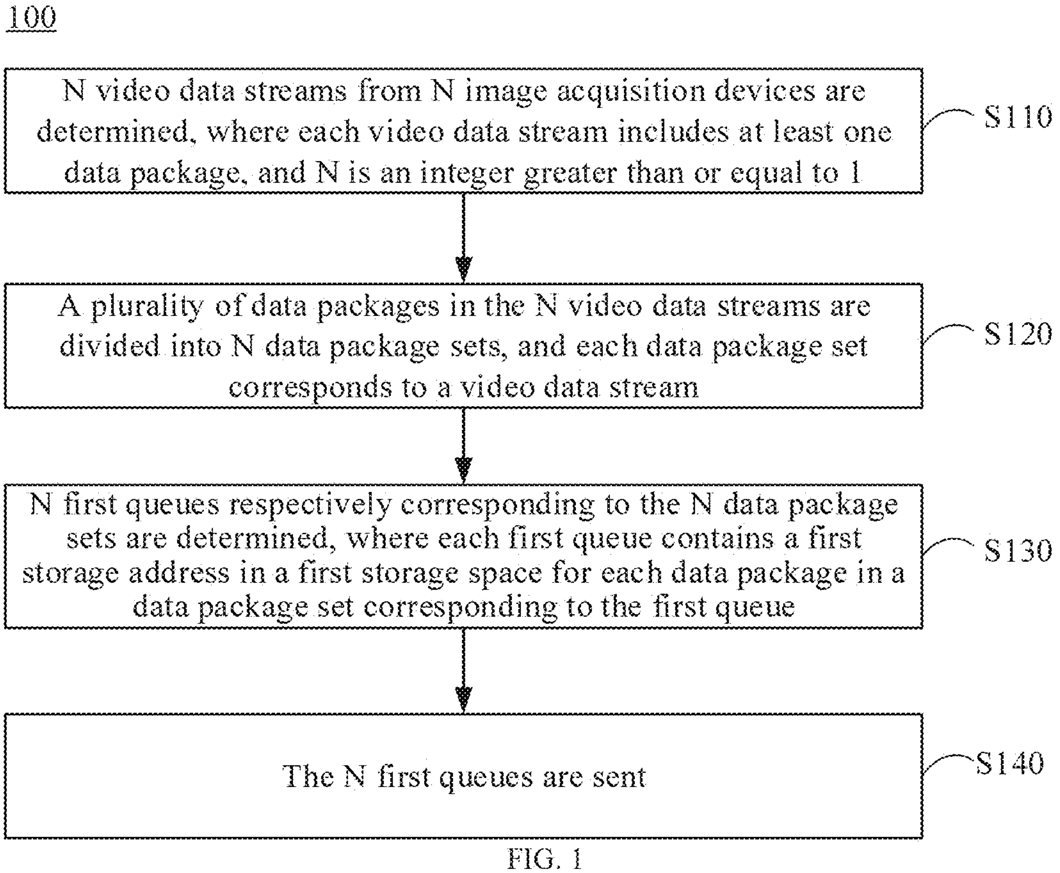
FIG. 1 shows a schematic flowchart of a video data stream processing method according to an embodiment of the present disclosure.

Embodiments of the present disclosure will be described below with reference to the accompanying drawings. However, it should be understood that these descriptions are merely exemplary and are not intended to limit the scope of the present disclosure. In the following detailed description, for ease of interpretation, many specific details are set forth to provide comprehensive understanding of embodiments of the present disclosure. However, it is clear that one or more embodiments may also be implemented without these specific details. In addition, in the following description, descriptions of well-known structures and technologies are omitted to avoid unnecessarily obscuring concepts of the present disclosure.

Terms are used herein for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C).

In technical solutions of the present disclosure, a collection, a storage, a use, a processing, a transmission, a provision, a disclosure, an application and other processing of data (including but not limited to user personal information) involved comply with provisions of relevant laws and regulations, take necessary security measures, and do not violate public order and good custom.

The present disclosure provides a video data stream processing method and an image processing method. The video data stream processing method may be performed by a video data stream processing apparatus, and the video data stream processing apparatus is Source. The image processing method may be performed by an image processing apparatus, and the image processing apparatus is Sink.

In a processing procedure, the video data stream processing apparatus may acquire video data streams collected by image acquisition devices, then determine N first queues based on the video data streams, and send the N first queues to the image processing apparatus. Then, the image processing apparatus may determine image frames based on the N first queues, and then process the image frames to obtain a processing result.

In the technical solutions provided in embodiments of the present disclosure, it is possible to complete an efficient access to a plurality of streaming media by concatenating and extracting data packages, determine a plurality of image frames based on a plurality of video stream data collected by a plurality of image acquisition devices, and then process the plurality of image frames in batches, so as to solve a problem of low efficiency in multi-threaded processing of a plurality of streaming media and solve a problem of overall accuracy decline and false alarm rate increase in a computer vision application caused by the low efficiency, and further reduce a device load, reduce costs and improve an apparatus utilization.

The technical solutions provided in embodiments of the present disclosure are applicable to streaming media computer vision applications. In an actual deployment process, the solutions provided in the present disclosure are applicable to, for example, a server side (such as x86 server), a box (such as ARM box), Android, etc., and may be deployed on terminal devices such as televisions and mobile phones.

The video data stream processing method and the image processing method will be described below.

FIG. 1 shows a schematic flowchart of a video data stream processing method according to an embodiment of the present disclosure.

As shown in FIG. 1, the video data stream processing method 100 may be performed by a video data stream processing apparatus, and the method 100 includes operation S110 to operation S140.

In operation S110, N video data streams from N image acquisition devices are determined, where each video data stream includes at least one data package, and N is an integer greater than or equal to 2.

For example, the image acquisition devices may include cameras, such as those installed in parks, shopping malls and other places, or cameras installed on moving objects such as autonomous vehicles. N may be 4, 16, etc.

For example, the image acquisition device may adopt video data streams, and the N image acquisition devices respectively correspond to the N video data streams. For example, a first image acquisition device Cam1 may collect a first video data stream Video1, and a second image acquisition device Cam2 may collect a second video data stream Video2.

It should be noted that in an actual processing procedure, the video data stream collected by the image acquisition device may be an H.264 stream, which may be encapsulated in RTSP, and then the data packages in the video data stream may be obtained by means of decoding RTSP and decoding H.264 stream.

In operation S120, a plurality of data packages in the N video data streams are divided into N data package sets, and each data package set corresponds to a video data stream.

It should be noted that the data packages in the N data streams enter a first storage space in chronological order, so the plurality of data packages in the first storage space are out of order. The plurality of data packages in the first storage space may be divided to obtain N data package sets.

For example, a plurality of data packages in the first video data stream from the first image acquisition device Cam1 are divided into a data package set A1, and a plurality of data packages in the video data stream from the second image acquisition device Cam2 are divided into a second data package set A2.

It should be noted that a video data stream collected by an image acquisition device may determine a data package set, and a data package set may include at least one data package subset. A data package subset may include at least one data package, and the data packages in a data package subset may be used to determine a complete image frame. For example, a data package set determined by the video data stream Video1 may include data packages of package1, package2, package3, package4, package5, package6 and package7. The data package set may include a first data package subset and a second data package subset. The first data package subset may include data packages of package1, package2 and package3, and the image processing apparatus may determine an image frame by using the first data package subset. The second data package subset may include data packages of package4, package5, package6 and package7, and the image processing apparatus may determine another image frame by using the second data package subset. The above-mentioned data packages may be based on rtp protocol, such as H264 compressed multiplexed packages.

It should be noted that in a process of transmitting the video data stream, if data that may determine a complete image frame is recorded in a data package, that data package may have a large volume. In an actual transmission process, if that data package fails to transmit due to network abnormalities or other reasons, it is needed to retransmit all data that may determine a complete image frame. If the data that may determine a complete image frame is divided into a plurality of data packages (which forms a data package subset), it is possible to retransmit a data package that fails to transmit, without transmitting the complete data package subset, so that a transmission efficiency may be improved.

In operation S130, N first queues respectively corresponding to the N data package sets are determined, where each first queue contains a first storage address in a first storage space for each data package in a data package set corresponding to the first queue.

For example, the first storage space may be a memory of the video data stream processing apparatus, and a storage address for the data package in the first storage space is referred to as the first storage address.

For example, the N data package sets respectively correspond to the N first queues. For example, the data package set A1 corresponds to a first queue Q1, and the data package set A2 corresponds to a first queue Q2. Accordingly, the first storage address for the data package in the data package set A1 may be added to the first queue Q1, and the first storage address for the data package in the data package set A2 may be added to the first queue Q2.

In operation 140, the N first queues are sent.

For example, the N first queues may be sent to the image processing apparatus, and a transmission method of the first queues may be a wired transmission method such as PCIE or a wireless transmission method such as WiFi.

In the technical solutions provided in embodiments of the present disclosure, the N first queues are determined based on the N video data streams, and each first queue contains first storage addresses for a plurality of data packages from an image acquisition device. In a processing procedure of the image processing apparatus, a plurality of image frames may be determined based on the first queues, and the plurality of image frames may be processed in batches, so that computing resources of the image processing apparatus may be used more, and a computing efficiency and accuracy may be improved.

In addition, the information in the first queue is the first storage address for the data package, rather than the data package. Therefore, in a process of data transmission, the data package only needs to be copied once, and it is not required to copy a data table to the first queue, so that an amount of data transmission may be reduced, a data transmission efficiency may be improved, and requirements for device hardware may be reduced.

According to another embodiment of the present disclosure, the process of dividing the plurality of data packages in the N video data streams into N data package sets may include: determining a video identification of a video data stream where each data package is located, then dividing the plurality of data packages according to the video identification to obtain N initial data package sets, and then determining the N data package sets according to the N initial data package sets.

For example, the data package may contain a video identification, the plurality of data packages may be divided based on the video identification to obtain a plurality of initial data package sets, and each initial data package set corresponds to a video identification. For example, a plurality of data packages in a first initial data package set contain a video identification of media1, and a plurality of data packages in a second initial data package set contain a video identification of media2. In embodiments of the present disclosure, the data package sets are divided according to the video identification, so that a first queue stores the first storage addresses for the data packages from the same image acquisition device, thereby ensuring that the N initial data package sets respectively correspond to the N video data streams.

For example, the N initial data package sets may be determined as the N data package sets, and the data packages in the data package set may be ranked randomly.

For another example, the data packages in the initial data package set may be ranked according to sequence numbers of the data packages in the initial data package set to obtain a data package sequence, and then the data package set may be determined according to the data package sequence.

For example, when transmitting data packages based on RTP protocol or TCP protocol, each data package has a serial number, which is also referred to as a sequence number. The serial number may be long integer data, and the plurality of serial numbers may be consecutive. The data packages in the data package set are arranged in sequence according to the serial numbers.

In such embodiments, the data packages in the data package set are arranged in sequence according to the serial numbers. Compared to an out-of-order arrangement, the technical solutions provided in such embodiments may ensure that the first storage addresses in the first queue are arranged in sequence according to the serial numbers of the data packages after the first queue is determined based on the data package set, and thus ensure that the image frames may be subsequently determined based on the ordered data packages. In addition, the image processing apparatus needs to decode the data packages according to the order of the data packages in the processing procedure to avoid decoding errors. In such embodiments, because the data packages in the data package set are arranged according to the sequence numbers, the image processing apparatus may decode the data packages in sequence, and it is not needed to re-determine a decoding order based on out-of-order data packages, so that the processing efficiency of the image processing apparatus may be improved, and the performance may be saved.

According to another embodiment of the present disclosure, in the process of determining the N first queues respectively corresponding to the N data package sets, for different data package subsets in a data package set, it is possible to add the first storage address for a current data package subset to the first queue after it is detected that the first storage address for a previous data package subset is contained in the first queue. In this way, the first storage addresses for a plurality of data packages in the same data package subset may be added to the first queue in order, so as to ensure an orderliness of the data packages.

According to another embodiment of the present disclosure, in the process of determining the N first queues respectively corresponding to the N data package sets, for different data packages in a data package subset, the data package subset includes a current data package and at least one previous data package, and it is possible to add the first storage address for the current data package to the first queue after it is detected that the first storage address for the previous data package is contained in the first queue. In this way, the first storage addresses for a plurality of data package subsets in the same data package set may be added to the first queue in order, so as to ensure an orderliness of the data package subsets.

According to another embodiment of the present disclosure, in the process of sending the N first queues, it is possible to send a target storage address in the first queue after it is detected that the target storage address in the first queue meets a predetermined condition.

For example, the predetermined condition includes that the data packages indicated by the target storage address are used to determine an image frame. The first queue may contain a plurality of target storage addresses, and the plurality of data packages stored in the plurality of target storage addresses may be used to determine a complete image frame, thereby avoiding that the image processing apparatus fails to obtain a complete image frame based on the data packages in the subsequent processing, and ensuring the accuracy of the image frame processing result.

For another example, the predetermined condition includes that the quantity of image frames corresponding to the N data package sets is greater than or equal to a threshold. The threshold may be an integer greater than or equal to 2, such as an arbitrary value from 8 to 16. Through the threshold, the quantity of image frames processed in batches by the image processing apparatus may be controlled, thereby avoiding wasting the computing resources of the image processing apparatus due to a too small quantity of image frames and ensuring the data processing efficiency.

According to another embodiment of the present disclosure, the video data stream processing method may further include the following operations: determining a target adjustment parameter according to a scene identification of a target scene, and then adjusting a usage of the N image acquisition devices according to the target adjustment parameter.

For example, a scene may be related to a data processing capability of apparatus, and a machine may include at least one of the video data stream processing apparatus and the image processing apparatus. The data processing capability of apparatus may be determined based on hardware information such as the quantity of processor cores. It is possible to pre-configure a corresponding relationship between apparatus information and scene, so that the scene identification may be determined based on the corresponding relationship after the apparatus information of the currently used apparatus is determined.

For example, it is possible to pre-configure a corresponding relationship between scene and adjustment parameter according to actual needs. After the scene identification of the target scene is obtained, the adjustment parameter corresponding to the scene identification may be found as the target adjustment parameter based on the scene identification and the corresponding relationship.

The target adjustment parameter may include a target quantity of image acquisition devices. For example, some apparatuses have weak data processing capabilities and may only process video data streams collected by five image acquisition devices, while other apparatuses have strong data processing capabilities and may process video data streams collected by ten image acquisition devices. Therefore, after it is detected that the target adjustment parameter includes the target quantity of image acquisition devices, it is possible to adjust an actual quantity of image acquisition devices according to the target quantity. For example, the actual quantity of image acquisition devices may be adjusted to be consistent with the target quantity, so that the quantity of video data streams is matched with the processing capacity of the apparatus.

The target adjustment parameter may include a target acquisition frequency of the image acquisition device. For example, some apparatuses have weak data processing capabilities and may process video data streams with 12 fps (frame per second), while other apparatuses have strong data processing capabilities and may process video data streams with 25 fps. Therefore, after it is detected that the target adjustment parameter includes the target acquisition frequency of the image acquisition device, it is possible to adjust an actual acquisition frequency of the image acquisition device according to the target acquisition frequency. For example, the actual acquisition frequency of the image acquisition device may be adjusted to be consistent with the target frequency, so that the acquisition frequency of the video data stream is matched with the processing capability of the apparatus.

Figure 2:
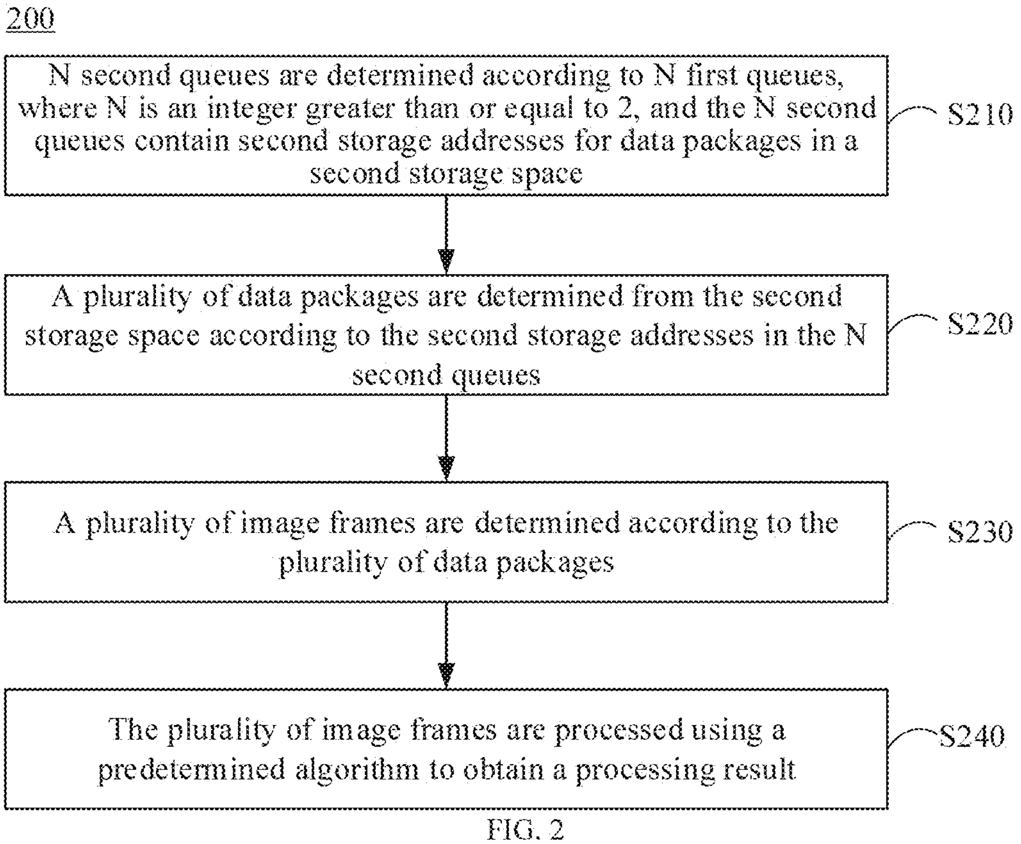
FIG. 2 shows a schematic flowchart of an image processing method according to an embodiment of the present disclosure.

FIG. 2 shows a schematic flowchart of an image processing method according to an embodiment of the present disclosure.

As shown in FIG. 2, the image processing method 200 may be performed by an image processing apparatus, and the method 200 may include operation S210 to operation S240.

In operation S210, N second queues are determined according to N first queues, where N is an integer greater than or equal to 2, and the N second queues contain second storage addresses for data packages in a second storage space.

For example, the video data stream processing apparatus may obtain the N first queues by using the above-mentioned video data stream processing method, and then send the N first queues to the image processing apparatus.

In an example, the first storage address in the first queue indicates an address for a data package in the first storage space, and the second storage address in the second queue indicates an address for a data package in the second storage space. The image processing apparatus may read a plurality of target data packages from the first storage space according to first storage addresses in the received first queue, and then store the plurality of target data packages in a second storage area, and then add the second storage addresses for the plurality of target data packages in the second storage area to the second queue.

In another example, if the image processing apparatus and the video stream processing apparatus share the same storage space, the N first queues may be determined as the N second queues.

In operation S220, a plurality of data packages are determined from the second storage space according to the second storage addresses in the N second queues.

For example, for each second queue, a data package at a second storage address in the second queue may be read from the second storage space based on the second address in the second queue.

In operation S230, a plurality of image frames are determined according to the plurality of data packages.

For example, the read data packages may be decoded and processed, and then an image frame may be determined by using data packages in a data package subset corresponding to the image frame. By processing a plurality of data package subsets in this way, it is possible to obtain a plurality of image frames, and the plurality of image frames are a batch of data.

In operation S240, the plurality of image frames are processed using a predetermined algorithm to obtain a processing result.

For example, a deep learning model may be used as the predetermined algorithm. The deep learning model may include, for example, YOLO. It is possible to input a plurality of images into the YOLO model, and the model may output a detection box as the processing result.

In the technical solutions provided in such embodiments, N first queues are determined based on N video data streams, and each first queue contains first storage addresses for a plurality of data packages from an image acquisition device. In the process procedure of the image processing apparatus, a plurality of image frames may be determined based on the first queues, and the plurality of image frames may be processed in batches, so that the computing resources of the image processing apparatus may be used more, and the computing efficiency and accuracy may be improved.

In some embodiments, after the image processing apparatus reads a plurality of target data packages from the first storage space, the video data stream processing apparatus may remove the plurality of target data packages from the first storage space, so that the first storage space may receive new data packages.

Figure 3:
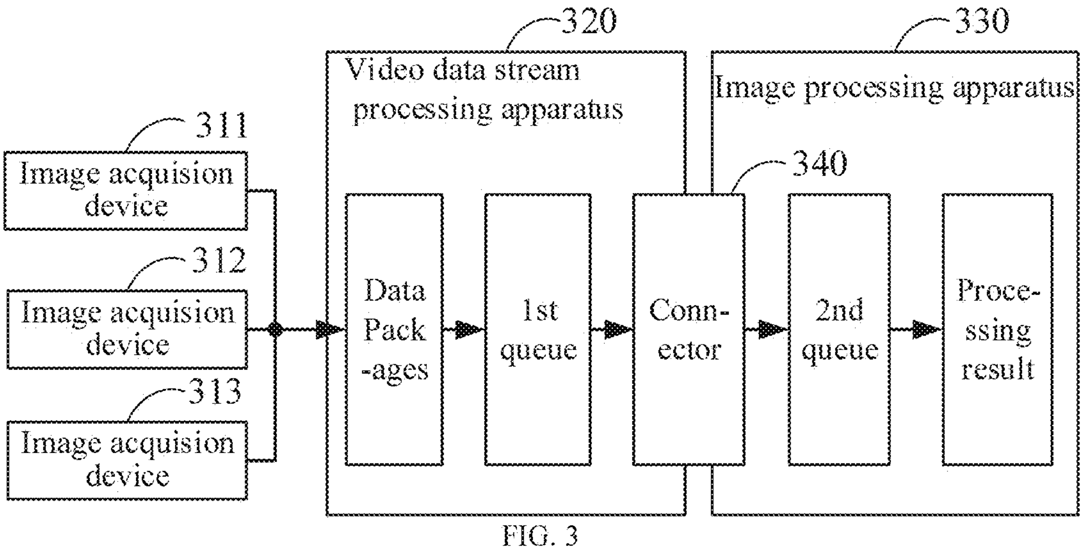
FIG. 3 shows a schematic structural diagram of an image processing apparatus according to an embodiment of the present disclosure.

FIG. 3 shows a schematic structural diagram of an image processing apparatus according to an embodiment of the present disclosure.

As shown in FIG. 3, in such embodiments, a platform includes image acquisition devices 311, 312 and 313, a video data stream processing apparatus 320, and an image processing apparatus 330.

The image acquisition devices 311, 312 and 313 are used to collect video data streams. N image acquisition devices 311, 312 and 313 may be provided, where N is an integer greater than or equal to 2. Three image acquisition devices are shown here.

The video data stream processing apparatus 320 may obtain N video data streams from the N image acquisition devices 311, 312 and 313, and each video data stream includes at least one data package. The video data stream processing apparatus 320 may divide a plurality of data packages in the N video data streams into N data package sets and determine N first queues. Then, the N first queues may be sent to the image processing apparatus 330 through a connector 340 or other means. The connector 340 may be a PCIe (Peripheral Component Interconnect Express) connector.

The image processing apparatus 330 may determine N second queues based on the N first queues, and then subsequent businesses act as consumers to consume the second storage addresses in the second queues, thereby achieving the process of determining and processing image frames.

Figure 4:
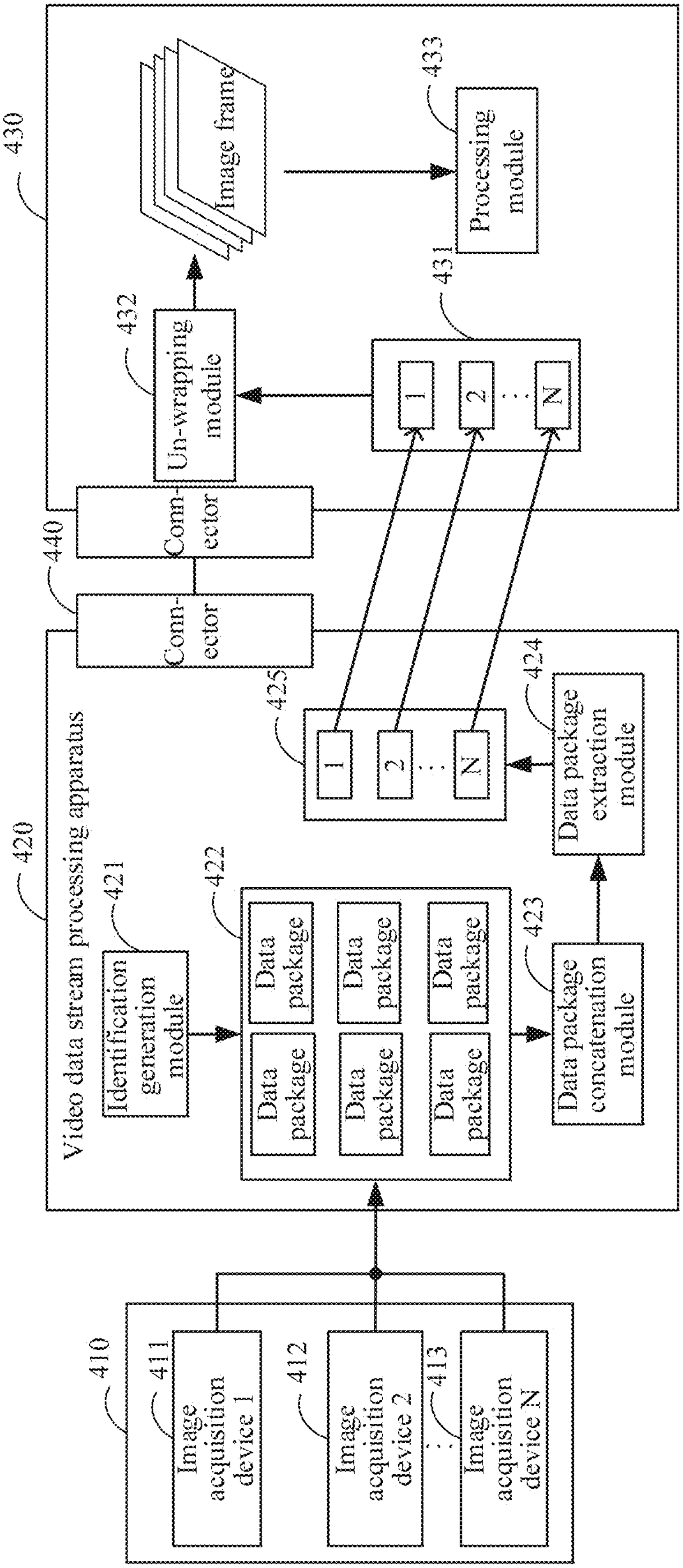
FIG. 4 shows a schematic structural diagram of an image processing apparatus according to an embodiment of the present disclosure.

FIG. 4 shows a schematic structural diagram of an image processing apparatus according to an embodiment of the present disclosure.

As shown in FIG. 4, in such embodiments, a platform includes an image acquisition device 410, a video data stream processing apparatus 420, and an image processing apparatus 430. A data transmission is performed between the video data stream processing apparatus 420 and the image processing apparatus 430 through a connector 440. In such embodiments, a data processing process of the video data stream processing apparatus 420 and a data processing process of the image processing apparatus 430 are mainly explained from a perspective of software.

N image acquisition devices 410 may be provided, such as image acquisition devices 411, 412 and 413. The N image acquisition devices 410 may send the N video data streams to the video data stream processing apparatus 420.

The video data stream processing apparatus 420 includes a plurality of functional modules, such as an identification generation module 421, a data package combination module 422, a data package concatenation module 423, a data package extraction module 424, and a first queue module 425. The functional modules in the video data stream processing apparatus 420 will be described below.

The identification generation module 421 may acquire a video data stream from the image acquisition device 410, and the video data stream includes a plurality of data packages. The identification generation module 421 may generate a video identification for each data package, and the video identification represents an identification of the video data stream to which the data package belongs, and may also represent the image acquisition device 410 that sent the data package. The video identification may be added to an extension field in the data package. Next, the identification generation module 421 may send the video identification and the data package to the data package combination module 422. It should be noted that the identification generation module 421 may acquire the video data stream from the image acquisition device 410 asynchronously, which is mainly due to a network congestion. For example, the video data stream includes a plurality of data packages, and a second data package is delayed due to a network congestion, resulting in a third data package being sent before the second data package. In this case, the video data stream processing apparatus 420 asynchronously receives the second data package. The image processing apparatus 430 may receive the video data stream asynchronously, and it is not required to wait for the data package that temporarily fails to transmit due to a network congestion, thereby improving the transmission efficiency of data packages.

The data package combination module 422 may store the data package in the first storage space, such as in a memory of the video data stream processing apparatus 420.

The data package concatenation module 423 may concatenate a plurality of data packages in the first storage space into a temporal stream with video identification, and the data packages may be arranged according to a time sequence in which the data packages are received in the first storage space.

In the actual concatenation process, the data package set may form a structure of N-dimensional array (ndarray). It is possible to firstly divide a plurality of data packages corresponding to the same video identification into the same initial data package set, and then rank the plurality of data packages in the initial data package set according to serial numbers. The ranked initial data package set is the data package set mentioned above. Next, a structure of N-dimensional array may be formed based on the order of the data package sets and the order of data packages in the same data package set. This structure is convenient for storage and use of data packages. As the data of such structure comes from the N image acquisition devices 410, and a concatenated data package subset includes a plurality of (e.g., 3) data packages, the N-dimensional array of these data packages may be easily used for row and column operations and retrieval. In other embodiments, the data package set may also form a linked list structure. As shown, if the data package is a NALU (Network Abstract Layer Unit), the concatenated data structure may contain more NALU. A structure of the NALU data package will be explained below and will not be described in detail here.

It should be noted that in a case of only one video data stream, the data packages in the first storage space only correspond to that video data stream. In a case of at least two video data streams, the data packages in the at least two video data streams may enter the first storage space in chronological order, so the plurality of data packages in the first storage space are out of order. For example, the plurality of video data packages in the first storage space may be in an order of: a first data package in a first video data package, a first data package in a second video data package, a second data package in the first video data package, a first data package in a third video data package, a third data package in the first video data package, etc.

In such embodiments, the plurality of data packages in the first storage space are grouped and ranked using the data package concatenation module 423, so as to obtain N data package sets. The data packages in each data package set are arranged in sequence, and the first queue may reflect the grouping and ranking of the data packages. In the subsequent processing procedure, the image processing apparatus may process the data packages in sequence based on the first queues to obtain a plurality of image frames, and then process the plurality of image frames in batches, so that the computing resources of the image processing apparatus may be used more, and the computing efficiency and accuracy may be improved.

The data package extraction module 424 may extract the first storage address inside the above-mentioned structure formed by the data packages. For example, a data package includes a plurality of fields, where a field of "data" represents specific data content in the data package, and the first storage address may contain a start position and an end position of the field of "data", and may also include a start position and an offset.

The first queue module 425 maintains the N first queues. For a first queue and a corresponding data package set, the first storage addresses for the data packages in the data package set may be added to the first queue.

The image processing apparatus 430 includes a plurality of functional modules, such as a second queue module 431, an unwrapping module 432, and a processing module 433. The functional modules in the image processing apparatus 430 will be described below.

The second queue module 431 maintains N second queues. A data structure of the first queue may be the same as that of the second queue. A difference between the first queue and the second queue is that the first storage address in the first queue indicates an address for the data package in the first storage space, where the first storage space may be, for example, CPU memory; and the second storage address in the second queue indicates an address for the data package in the second storage space, where the second storage space may be, for example, GPU memory. The first queue and the second queue may both be inter-process shared CV (computer vision) frame queues.

The unwrapping module 432 may acquire the second storage addresses from the second queue, then read data packages from the second storage space based on the second storage addresses, and perform predetermined decoding to process a single data package subset into an image frame, thereby obtaining a plurality of image frames. The plurality of image frames may be used as a batch of data, which may be used for AI business processing, alarm generation, and other functions. It should be noted that the process of processing a single data package subset into an image frame may include decoding, and a decoding method is not limited in such embodiments.

In some embodiments, a plurality of image frames in a batch of data may have associations. For example, a batch of input data required in model processing for face recognition services may come from a plurality of image acquisition devices. In a case of cross-camera tracking, an object may appear in fields of view of some specific image acquisition devices. In this case, it is not needed to use data in all time as input data for the model, and only the data packages collected for that object in those specific image acquisition devices are used as a batch of data. In other embodiments, a plurality of image frames in a batch of data may also be unassociated.

The processing module 433 is used to process a plurality of image frames to obtain a processing result. The processing module 433 may include, for example, a CV preprocessing (CV_RESIZE) module and a deep learning model. The deep learning model may be, for example, a YOLO model, which may include a convolutional layer. In the process of the processing module 433 processing a plurality of image frames in a batch of data, the order of the plurality of image frames is not limited, and the plurality of image frames may be processed in chronological order or in random order.

It should be noted that the deep learning model may be determined according to actual needs, which is not limited in the embodiments. The above-mentioned YOLO model may be applied to scenarios of recognizing objects in parks, gardens and other places, and the objects include users, vehicles, etc. The image processing apparatus 430 may determine a source of the data package based on the video identification of the video to which the data package belongs, and then perform data analysis in conjunction with an actual position of the image acquisition device 410. For example, based on a recognized user, it is possible to confirm a recognition accuracy of multiple people from various angles. Based on a recognized vehicle, it is possible to perform vehicle tracking. For another example, the data packages from the plurality of image acquisition devices 410 may be concatenated into a set of image frames, which may improve speed performance and allow analyzing the vehicle from multiple perspectives, thereby improving the accuracy of vehicle recognition.

Compared to a method of providing only one image acquisition device 410, N image acquisition devices 410 are used in such embodiments. The video data stream processing apparatus 420 may output N first queues, and then the image processing apparatus 430 may process a batch of image frames. It should be noted that the processing module 433 may adopt a parallel processing method. The processing model may require 20 ms to process an image frame, and require only slightly more than 20 ms to process eight image frames. Therefore, for a predetermined quantity of image frames, if more image frames are processed in one processing procedure to use more computing resources of the image processing apparatus 430, the processing efficiency of processing the predetermined quantity of image frames may be improved. As shown, by increasing a batch size in such embodiments, in a cycle of a code execution of the processing module 433, more image frames are provided to the processing module 433, and the image frames are processed in batches to reduce the computation and storage of wrapping and un-wrapping in each link of data transmission, thereby improving the processing efficiency.

Figure 5:
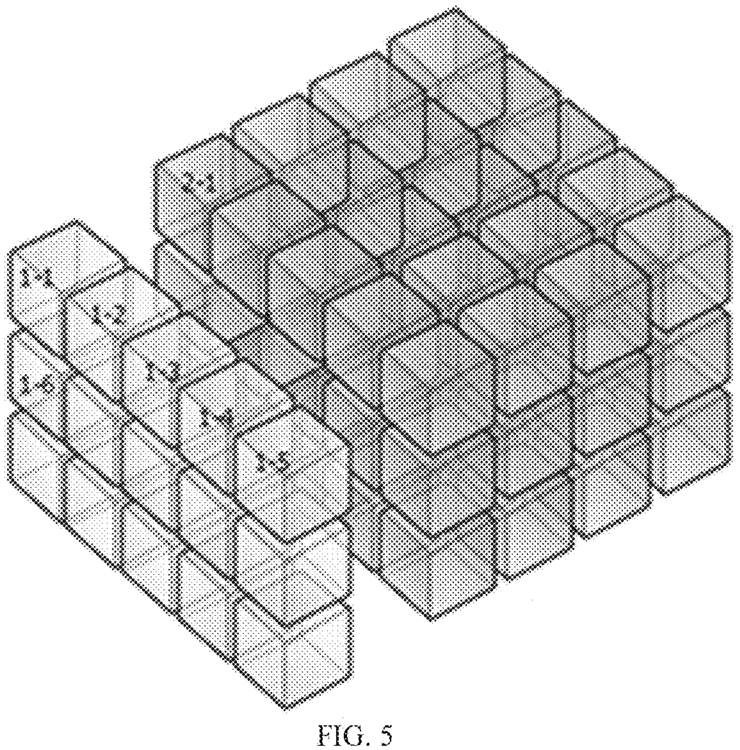
FIG. 5 shows a schematic structural diagram of a plurality of data packages according to an embodiment of the present disclosure.

FIG. 5 shows a schematic structural diagram of a plurality of data packages according to an embodiment of the present disclosure.

For example, the data package concatenation module mentioned above may concatenate a plurality of data packages in the first storage space into a temporal stream with video identifications. It may be understood that the data package subsets in a data package set in the first storage space are arranged in chronological order, and the data packages in a data package subset are arranged according to serial numbers. The above-mentioned temporal stream may indicate a data package set obtained by ranking the plurality of data packages in chronological order.

FIG. 5 shows two data package sets, and each small square represents a data package. A data package set includes a plurality of data package subsets. For example, a data package subset includes data packages 1-1, 1-2 and 1-3, and the other data package subset includes data packages 1-4, 1-5 and 1-6. Another data package set may also include a plurality of data package subsets, and each data package subset includes at least one data package. For example, a data package subset includes a data package 2-1.

Figure 6:
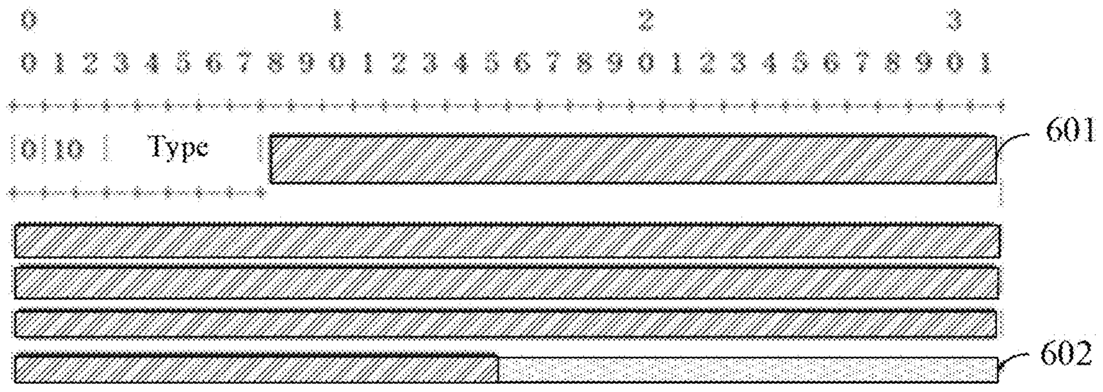
FIG. 6 shows a schematic diagram of a data structure of a data package according to an embodiment of the present disclosure.

FIG. 6 shows a schematic diagram of a data structure of a data package according to an embodiment of the present disclosure.

As shown in FIG. 6, in some embodiments, the data package may be NALU. A data structure of NALU is shown in FIG. 6. For example, a first bit is 0, a fourth bit to an eighth bit represent type, and the specific NALU data starts from second eight bits. A shaded area in FIG. 6 represents specific NALU data 601. An extension field 602 follows the specific NALU data 601, and information such as video identification and serial number may be added to the extension field 602. The information such as video identification and serial number may also be stored in other storage areas outside the data package, and a mapping relationship between the above-mentioned information and the data package may be established according to the actual storage situation. The video identification, the serial number and the first storage address corresponding to a data package may be queried based on the mapping relationship.

Figure 7:
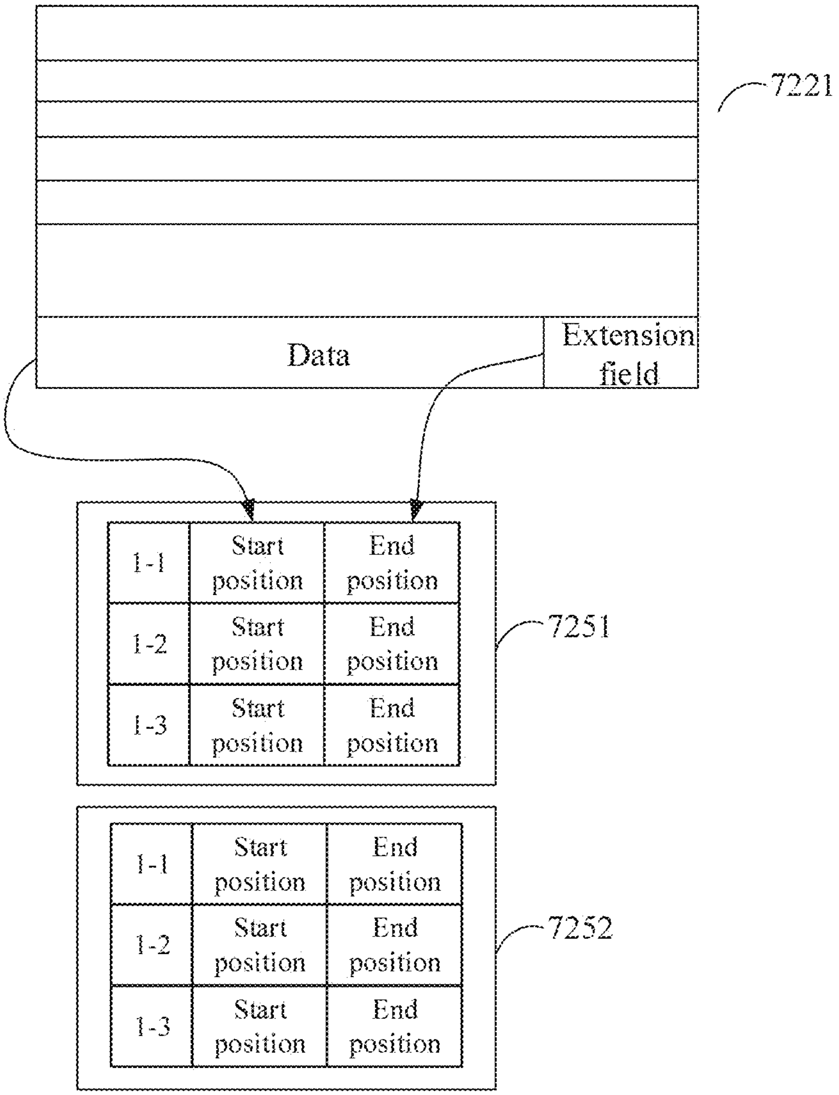
FIG. 7 shows a schematic diagram of a data package extraction according to an embodiment of the present disclosure.

FIG. 7 shows a schematic diagram of a data package extraction according to an embodiment of the present disclosure.

For example, the first storage address may be extracted inside a structure formed by a data package 7221. For example, a data package has a plurality of fields, where field of Data represents specific data content in the data package. The first storage address may contain a start position and an end positions of the field of Data, and may also include a start position and an offset. Then, the first storage address is added to a first queue 7251. For example, the first storage addresses for data packages in another data package set may be added to another first queue 7252. In addition, the data package may further have an extension field that may be used to store video identification and serial number.

Figure 8:
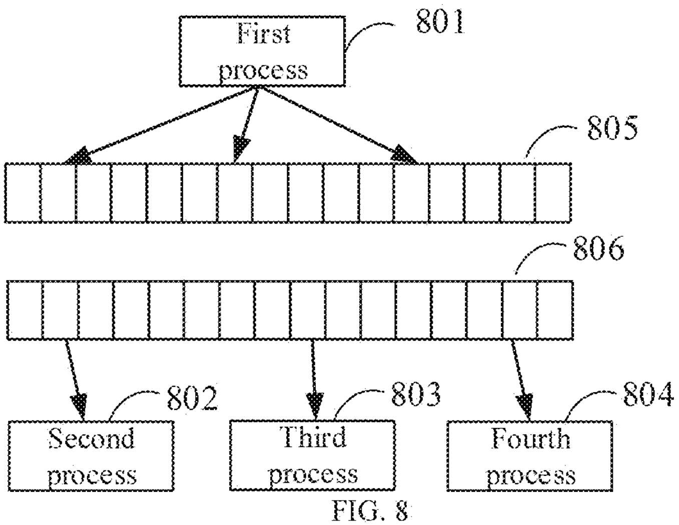
FIG. 8 shows a schematic diagram of a processing procedure of an image acquisition apparatus according to an embodiment of the present disclosure.

FIG. 8 shows a schematic diagram of a processing procedure of the image acquisition apparatus according to an embodiment of the present disclosure.

In the actual processing procedure, for example, a first process 901 of the video data stream processing apparatus may add data packages 1 to 20 to a first queue 805. Among these data packages, data packages 1 to 9 belong to a first data package subset, data packages 10 to 19 belong to a second data package subset, and data packages 20 to 30 belong to a third data package subset. The image processing apparatus may have a large quantity of GPU cores, and many processes may run in parallel. For example, the quantity of cores may be the same as the quantity of parallel threads, and a thread may include a plurality of processes. As shown in FIG. 8, a second process 802 may be used to pull a first data package subset from a second queue 806, a third process 803 may be used to pull a second data package subset from a second queue 806, and a fourth process 804 may be used to pull a third data package subset from the second queue 806. The second process 802, the third process 803 and the fourth process 804 may be processed in parallel.

Figure 9:
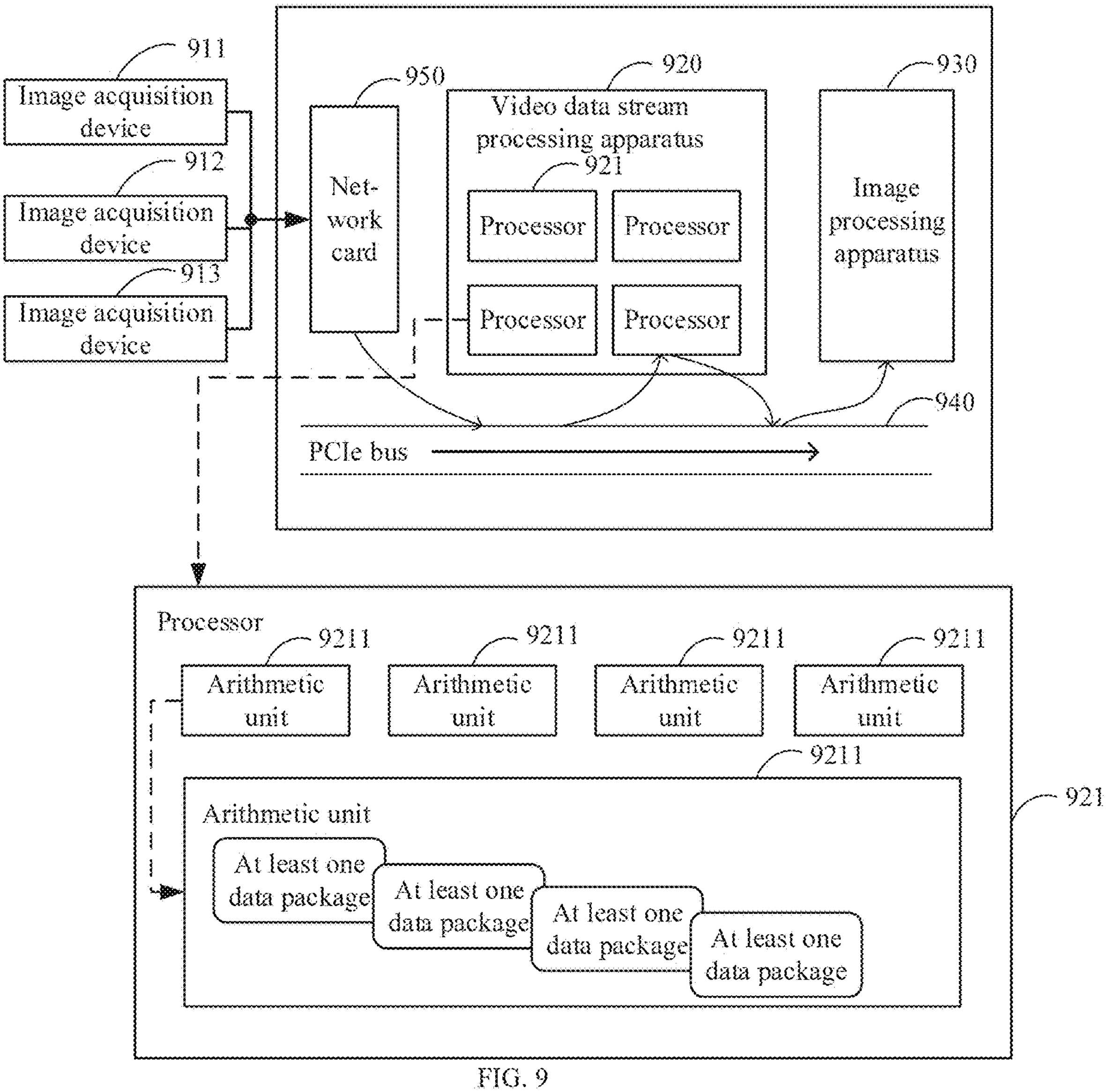
FIG. 9 shows a schematic structural diagram of an image processing apparatus according to another embodiment of the present disclosure.

FIG. 9 shows a schematic structural diagram of an image processing apparatus according to another embodiment of the present disclosure.

As shown in FIG. 9, in such embodiments, a platform includes image acquisition devices 911, 912 and 913, a video data stream processing apparatus 920, an image processing apparatus 930, a PCIe bus 940, and a network card 950. Such embodiments mainly explain the platform from a perspective of hardware.

N image acquisition devices are used to collect video data streams. For example, the video data streams may be rtsp streams, which include rtp packages containing H.264 NALU. The video data stream is firstly transmitted from the image acquisition device to the network card 950, and then transmitted to a processor 921 in the video data stream processing apparatus 920 via the PCIe bus 940.

The video data stream processing apparatus 920 includes at least one processor 921, and each processor may include at least one arithmetic unit 9211. The processor 921 includes four arithmetic units 9211, indicating that the quantity of cores of the processor 921 is 4. The arithmetic unit 9211 may process the video data stream, and the video data stream includes a plurality of data packages which may be NALU. The video data stream processing apparatus 920 may process a plurality of data packages to obtain N first queues. Next, the N first queues and/or a plurality of data packages in the N video data streams are transmitted to the image processing apparatus 930 via the PCIe bus 940. The image processing apparatus 930 may process the plurality of data packages to determine image frames and a processing result for the image frames.

It should be noted that FIG. 4 mainly illustrates the data processing process of the video data stream processing apparatus from a perspective of software, while FIG. 9 mainly illustrates the video data stream processing apparatus from a perspective of hardware. The process of processing data packages by the arithmetic unit 9211 in FIG. 9 may refer to the data processing process of the identification generation module 421, the data package combination module 422, the data package concatenation module 423, the data package extraction module 424 and the first queue module 425 in FIG. 4, which will not be repeated in such embodiments.

It should be noted that FIG. 9 shows four processors 921 and four arithmetic units 9211, where a processor 921 containing arithmetic units 9211 shown below is used to illustrate one of the processors 921 above, and an arithmetic unit 9211 shown below is used to illustrate a first arithmetic unit 9211 above.

Figure 10:
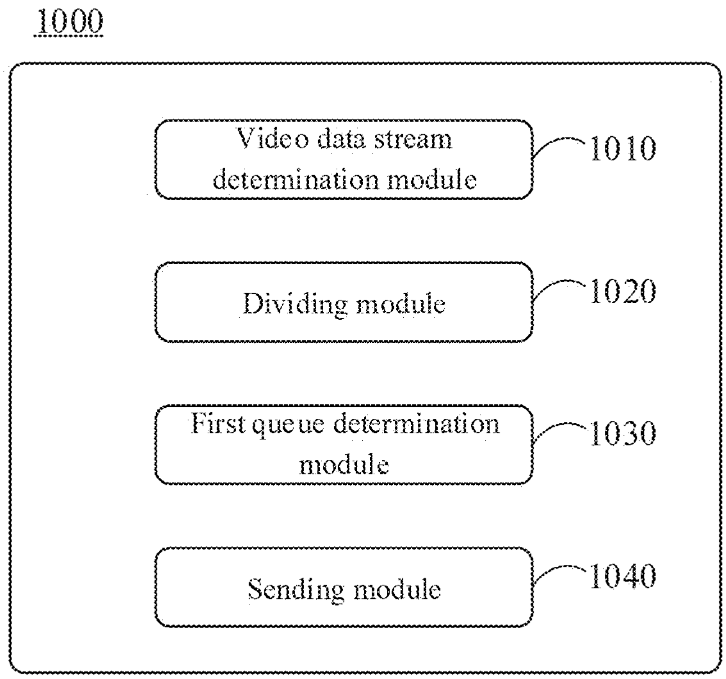
FIG. 10 shows a schematic structural block diagram of a video data stream processing device according to an embodiment of the present disclosure.

FIG. 10 shows a schematic structural block diagram of a video data stream processing device according to an embodiment of the present disclosure.

As shown in FIG. 10, the video data stream processing device 1000 may include a video data stream determination module 1010, a dividing module 1020, a first queue determination module 1030, and a sending module 1040.

The video data stream determination module 1010 is used to determine N video data streams from N image acquisition devices, where each video data stream includes at least one data package, and N is an integer greater than or equal to 2.

For example, the video data stream determination module 1010 may be used to implement partial functions in the identification generation module 421 mentioned above.

The dividing module 1020 is used to divide a plurality of data packages in the N video data streams into N data package sets, where each data package set corresponds to a video data stream. For example, an implementation of the dividing module 1020 may refer to the data package combination module 422, the data package concatenation module 423 and the data package extraction module 424 mentioned above.

The first queue determination module 1030 is used to determine N first queues respectively corresponding to the N data package sets, where each first queue contains a first storage address in a first storage space for each data package in a data package set corresponding to the first queue. An implementation of the first queue determination module 1030 may refer to the first queue module 425 mentioned above.

The sending module 1040 is used to send the N first queues.

According to another embodiment of the present disclosure, the dividing module includes: an identification determination sub-module, a dividing sub-module, and a data package set determination sub-module. The identification determination sub-module is used to determine a video identification of a video data stream where each data package is located. The dividing sub-module is used to divide a plurality of data packages according to the video identification to obtain N initial data package sets. The data package set determination sub-module is used to determine N data package sets according to the N initial data package sets.

According to another embodiment of the present disclosure, the data package set determination sub-module includes a sequence determination unit and a data package set determination unit. The sequence determination unit is used to rank the data packages in the initial data package set according to sequence numbers of the data packages in the initial data package set, so as to obtain a data package sequence. The data package set determination unit is used to determine a data package set according to the data package sequence. For example, an implementation of the sequence determination unit and the data package set determination unit may refer to the data package concatenation module 423 in FIG. 4.

According to another embodiment of the present disclosure, the data package set includes at least one data package subset, each data package subset includes at least one data package, and each data package subset corresponds to an image frame. The first queue determination module includes a first add sub-module and a second add sub-module. The first add sub-module is used to add the first storage address for a current data package to the first queue in response to a detection that the first storage address for a previous data package is contained in the first queue, where the current data package and the previous data package belong to the same data package subset. In this way, the first storage addresses for a plurality of data packages in the same data package subset may be added to the first queue in order, thereby ensuring the orderliness of the data package subset, that is, ensuring the orderliness of the image frames. The second add sub-module is used to add the first storage address for a current data package subset to the first queue in response to a detection that the first storage address for a previous data package subset is contained in the first queue, where the current data package subset and the previous data package subset belong to the same data package set. In this way, the first storage addresses for a plurality of data package subsets in the same data package set may be added to the first queue in order, thereby ensuring the orderliness of the data package subsets, so that the image processing apparatus may process the data packages subsequently as needed.

According to another embodiment of the present disclosure, the data package set includes at least one data package subset, and each data package subset corresponds to an image frame. The sending module includes a sending submodule, which is used to send a target storage address in the first queue in response to a detection that the target storage address in the first queue meets a predetermined condition, where there may be at least one target storage address, and the predetermined condition includes that at least one data package indicated by the at least one target storage address is used to determine a complete image frame.

According to another embodiment of the present disclosure, the predetermined condition further includes that a quantity of image frames corresponding to the N data package sets is greater than or equal to a threshold. For example, a serial number of a data package may indicate whether that data package is a last data package required to be decoded to obtain an image frame. Therefore, the quantity of complete image frames corresponding to the plurality of data packages in the N data package sets may be determined according to the serial number.

For example, it is possible to pre-configure a threshold according to a size of the image frame. For example, if an amount of data for a single transmission is preset to 20 M and an amount of data used to decode to obtain an image frame is approximately 2 M, the threshold may be set to 10.

For example, the threshold may be 1, which indicates real-time transmission, that is, when data packages that may be decoded to obtain a complete image frame is received, the first queue storing the first storage addresses for those data packages may be sent.

For another example, the threshold may be greater than 1, which indicates batch transmission, that is, the transmission of the first queue is performed after the quantity of complete image frames corresponding to the data packages reaches the threshold.

According to another embodiment of the present disclosure, the apparatus further includes a removal module, which is used to remove a plurality of target data packages from the first storage space in response to the plurality of target data packages being read from the first storage space. It should be noted that in such embodiments, the data packages read from the first storage space is referred to as the target data packages.

According to another embodiment of the present disclosure, the apparatus further includes a parameter determination module, a quantity adjustment module, and a frequency module. The parameter determination module is used to determine a target adjustment parameter according to a scene identification of a target scene, where the target adjustment parameter includes at least one of a target quantity of image acquisition devices and a target acquisition frequency of the image acquisition device. The quantity adjustment module is used to adjust an actual quantity of image acquisition devices according to the target quantity in response to a detection that the target adjustment parameter includes the target quantity of image acquisition devices. The frequency module is used to adjust an actual acquisition frequency of the image acquisition device according to the target acquisition frequency in response to a detection that the target adjustment parameter includes the target acquisition frequency of the image acquisition device.

According to another embodiment of the present disclosure, the data package includes a network abstract layer unit.

Figure 11:
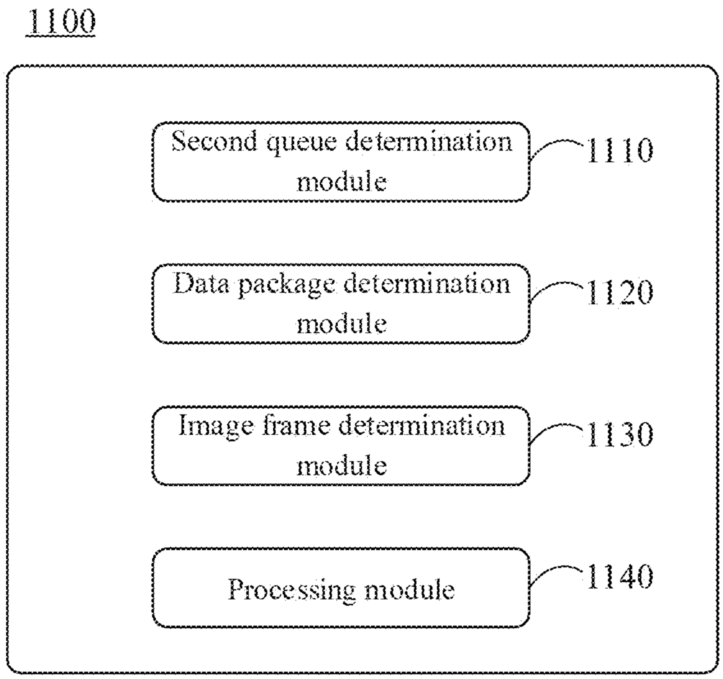
FIG. 11 shows a schematic structural block diagram of an image processing device according to an embodiment of the present disclosure.

FIG. 11 shows a schematic structural block diagram of an image processing device according to an embodiment of the present disclosure.

As shown in FIG. 11, the image processing device 1100 may include a second queue determination module 1110, a data package determination module 1120, an image frame determination module 1130, and a processing module 1140.

The second queue determination module 1110 is used to determine N second queues according to N first queues, where N is an integer greater than or equal to 2, and the N second queues contain second storage addresses for data packages in a second storage space.

The data package determination module 1120 is used to determine a plurality of data packages from the second storage space according to the second storage addresses in the N second queues.

The image frame determination module 1130 is used to determine a plurality of image frames according to the plurality of data packages.

The processing module 1140 is used to process the plurality of image frames using a predetermined algorithm to obtain a processing result.

According to another embodiment of the present disclosure, the second queue determination module includes a read sub-module, a storage sub-module and a third add sub-module. The read sub-module is used to read a plurality of target data packages from the first storage space according to the first storage addresses in the received first queue. The storage sub-module is used to store the plurality of target data packages in a second storage area. The third add sub-module is used to add the second storage addresses for the plurality of target data packages in the second storage area to the second queue.

Figure 12:
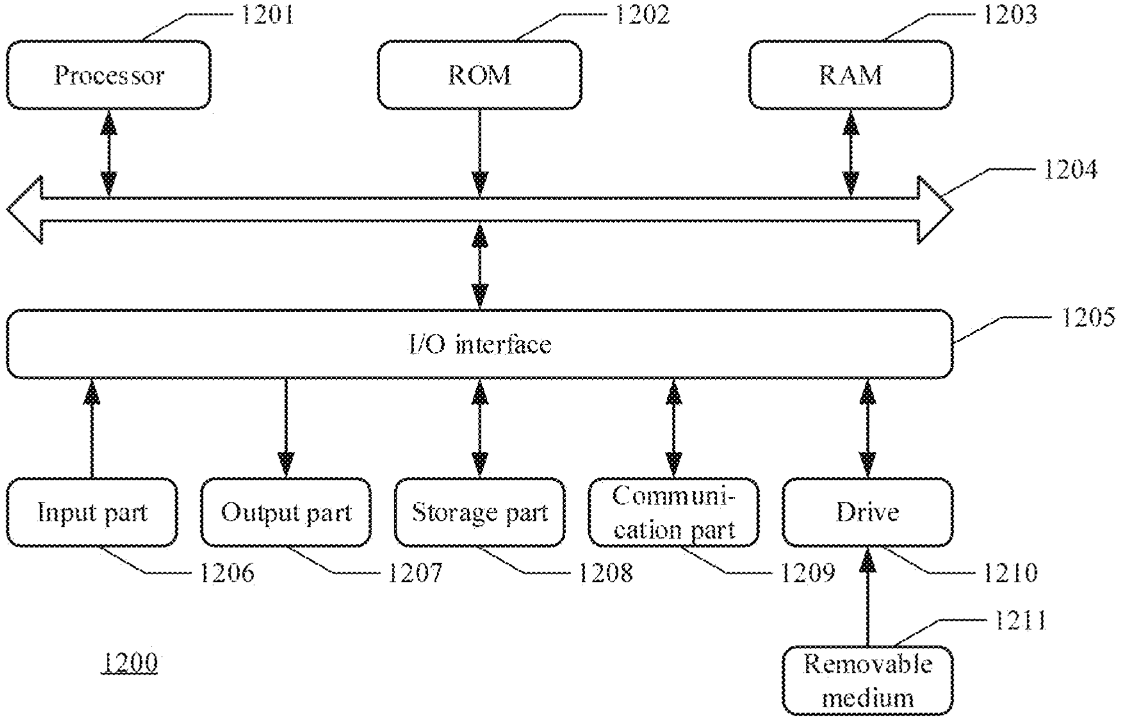
FIG. 12 shows a structural block diagram of an electronic device used to implement the video data stream processing method and/or the image processing method in embodiments of the present disclosure.

FIG. 12 shows a structural block diagram of an electronic device used to implement the video data stream processing method and/or image processing method in embodiments of the present disclosure.

As shown in FIG. 12, an electronic device 1200 according to embodiments of the present disclosure includes a processor 1201, which may execute various appropriate actions and processing according to the program stored in a read only memory (ROM) 1202 or the program loaded into a random access memory (RAM) 1203 from a storage part 1208. The processor 1201 may, for example, include a general-purpose microprocessor (for example, CPU), an instruction set processor and/or a related chipset and/or a special-purpose microprocessor (for example, an application specific integrated circuit (ASIC)), and the like. The processor 1201 may further include an on-board memory for caching purposes. The processor 1201 may include a single processing unit or plurality of processing units for executing different actions of the method flow according to embodiments of the present disclosure.

Various programs and data required for the operation of the device 1200 are stored in the RAM 1203. The processor 1201, the ROM 1202 and the RAM 1203 are connected to each other through a bus 1204. The processor 1201 executes various operations of the method flow according to embodiments of the present disclosure by executing the programs in the ROM 1202 and/or the RAM 1203. It should be noted that the program may also be stored in one or more memories other than the ROM 1202 and the RAM 1203. The processor 1201 may also execute various operations of the method flow according to embodiments of the present disclosure by executing the programs stored in the one or more memories.

According to embodiments of the present disclosure, the electronic device 1200 may further include an input/output (I/O) interface 1205 which is also connected to the bus 1204. The device 1200 may further include one or more of the following components connected to the I/O interface 1205: an input part 1206 including a keyboard, a mouse, etc.; an output part 1207 including a cathode ray tube (CRT), a liquid crystal display (LCD), etc. and a speaker, etc.; a storage part 1208 including a hard disk, etc.; and a communication part 1209 including a network interface card such as a LAN card, a modem, and the like. The communication part 1209 performs communication processing via a network such as the Internet. A drive 1210 is also connected to the I/O interface 1205 as required. A removable medium 1211, such as a magnetic disk, an optical disk, a magneto-optical disk, a semiconductor memory, and the like, is installed on the drive 1210 as required, so that the computer program read therefrom is installed into the storage part 1208 as needed.

The present disclosure further provides a computer-readable storage medium, which may be included in the apparatus/device/system described in the above embodiments; or exist alone without being assembled into the apparatus/device/system. The above-mentioned computer-readable storage medium carries one or more programs that when executed, perform the methods according to embodiments of the present disclosure.

According to embodiments of the present disclosure, the computer-readable storage medium may be a non-volatile computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device. For example, according to embodiments of the present disclosure, the computer-readable storage medium may include the above-mentioned ROM 1202 and/or RAM 1203 and/or one or more memories other than the ROM 1202 and RAM 1203.

Embodiments of the present disclosure further include a computer program product, which contains a computer program. The computer program contains program code for performing the method as shown in the flowchart. When the computer program product runs on a computer system, the program code causes the computer system to implement the methods provided in embodiments of the present disclosure.

When the computer program is executed by the processor 1201, the above-mentioned functions defined in the system/apparatus of the embodiments of the present disclosure are performed. According to embodiments of the present disclosure, the above-described systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 1209, and/or installed from the removable medium 1211. The program code contained in the computer program may be transmitted by any suitable medium, including but not limited to a wireless one, a wired one, or any suitable combination of the above.

In such embodiments, the computer program may be downloaded and installed from the network through the communication part 1209, and/or installed from the removable medium 1211. When the computer program is executed by the processor 1201, the above-mentioned functions defined in the system of embodiments of the present disclosure are performed. According to embodiments of the present disclosure, the above-described systems, apparatuses, devices, modules, units, etc. may be implemented by computer program modules.

According to the embodiments of the present disclosure, the program code for executing the computer programs provided by the embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program code may be completely executed on the user computing device, partially executed on the user device, partially executed on the remote computing device, or completely executed on the remote computing device or server. In a case of involving a remote computing device, the remote computing device may be connected to a user computing device through any kind of network, including a local area network (LAN) or a wide area networks (WAN), or may be connected to an external computing device (e.g., through the Internet using an Internet service provider).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that various embodiments of the present disclosure and/or the features described in claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

Embodiments of the present disclosure have been described above. However, these embodiments are for illustrative purposes only, and are not intended to limit the scope of the present disclosure. Although the various embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A method of processing a video data stream, comprising:

asynchronously receiving N video data streams from N image acquisition devices, wherein each video data stream comprises at least one data package, and N is an integer greater than or equal to 2;

storing a plurality of data packages received from the N video data streams in a first storage space in chronological order of entering the first storage space, wherein data packages of any video data stream are distributed non-contiguously in the first storage space;

determining a video identification of a video data stream where each data package is located, dividing the plurality of data packages in the first storage space according to the video identification to obtain N initial data package sets, each initial data package set corresponding to a video identification;

ranking the data packages in the initial data package set according to sequence numbers of the data packages in the initial data package set, so as to obtain a data package sequence, and determining the data package set according to the data package sequence;

determining N first queues respectively corresponding to the N data package sets, wherein each first queue contains a first storage address in the first storage space for each data package in a data package set corresponding to the first queue; and sending the N first queues.

2. The method according to claim 1, wherein the data package set comprises at least one data package subset, each data package subset comprises at least one data package, and each data package subset corresponds to an image frame; the determining N first queues respectively corresponding to the N data package sets comprises:

adding the first storage address for a current data package to the first queue in response to a detection that the first storage address for a previous data package is contained in the first queue, wherein the current data package and the previous data package belong to the same data package subset; and adding the first storage address for a current data package subset to the first queue in response to a detection that the first storage address for a previous data package subset is contained in the first queue, wherein the current data package subset and the previous data package subset belong to the same data package set.

3. The method according to claim 1, wherein the data package set comprises at least one data package subset, and each data package subset corresponds to an image frame; the sending the N first queues comprises:

sending a target storage address in the first queue in response to a detection that the target storage address in the first queue meets a predetermined condition, wherein the predetermined condition comprises that the data packages indicated by the target storage address are used to determine an image frame.

4. The method according to claim 3, wherein the predetermined condition further comprises that a quantity of image frames corresponding to the N data package sets is greater than or equal to a threshold.

5. The method according to claim 1, further comprising: removing a plurality of target data packages from the first storage space in response to the plurality of target data packages being read from the first storage space.

6. The method according to claim 1, further comprising: determining a target adjustment parameter according to a scene identification of a target scene, wherein the target adjustment parameter comprises at least one of a target quantity of image acquisition devices and a target acquisition frequency of the image acquisition device;

adjusting an actual quantity of image acquisition devices according to the target quantity of image acquisition devices, in response to a detection that the target adjustment parameter comprises the target quantity of image acquisition devices; and adjusting an actual acquisition frequency of the image acquisition device according to the target acquisition frequency of the image acquisition device, in response to a detection that the target adjustment parameter comprises the target acquisition frequency of the image acquisition device.

7. The method according to claim 1, wherein the data package comprises a network abstract layer unit.

8. An apparatus of processing a video data stream, comprising a memory and a processor, wherein the memory stores instructions executable by the processor, and the instructions are configured to, when executed by the processor, cause the processor to perform the method of claim 1.

9. A non-transitory computer-readable storage medium storing computer instructions thereon, wherein the computer instructions are configured to cause a computer to perform the method of claim 1.

* * * * *